United States Patent Office 3,424,945
Patented Jan. 28, 1969

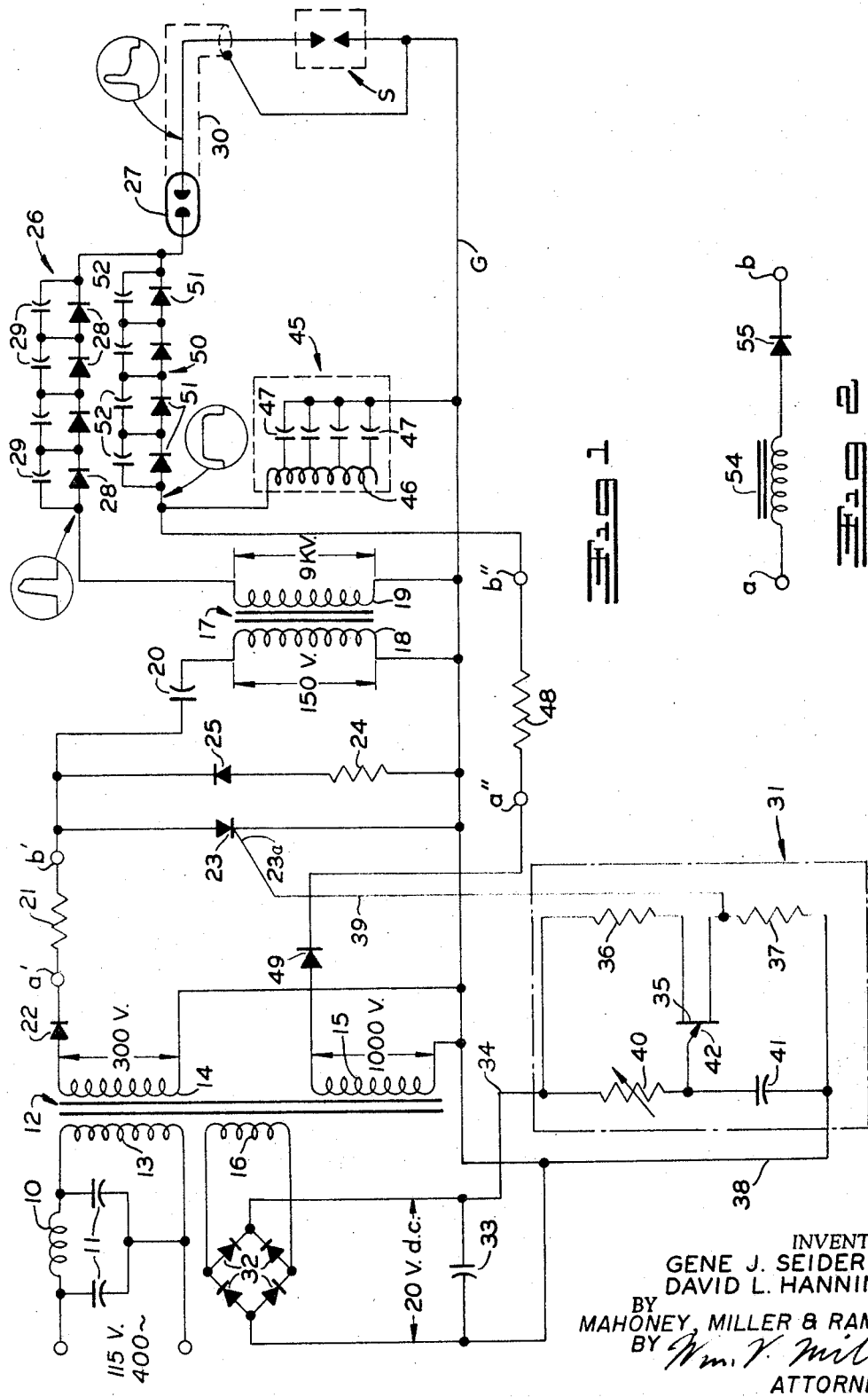

3,424,945
CONTROLLED CAPACITOR-DISCHARGE GAS TURBINE IGNITION SYSTEM
Gene J. Seider and David L. Hanning, Mansfield, Ohio, assignors to Mid-Continent Manufacturing Co., Columbus, Ohio, a corporation of Ohio
Filed Mar. 27, 1967, Ser. No. 626,118
U.S. Cl. 315—240                  11 Claims
Int. Cl. H05b 41/29

ABSTRACT OF THE DISCLOSURE

Ignition energy for operation of an electric energy discharge device is supplied through controlled discharge of a capacitor and secondary electric energy storage means. Discharge is controlled by electronic switching means which is operated by an electronic timer thereby forming electrical ignition energy pulses that are applied to the discharge device. Breakdown of the normally open circuit discharge device is effected by the first energy storage means and subsequent to establishment of a conductive circuit, the secondary energy storage means discharges to sustain the spark discharge for a predetermined time interval.

---

Ignition systems for gas turbine engines which, in the present context, includes those engines that generate power from combustion of a fuel-air mixture as contrasted to steam turbine engines, present a requirement for recurrent spark discharges at the igniter plugs for consistent and sustained operation of the engine. This requirement for recurrent ignition pulses or spark discharges is difficult to achieve due to the inherent operational characteristics of gas turbine engines. A turbine engine does not present a relatively steady state combustion chamber situation as is found in the case of the more conventional and well-known internal combustion engine. In an internal combustion engine, the combustible fuel-air mixture that is introduced into the cylinders is maintained within a relatively fixed ratio limit to assure proper combustion and this fuel-air mixture is introduced in a predetermined manner into a combustion chamber. The igniter device in such instances is not required to cope with a gaseous mixture of combustible material which is moving at a relatively high velocity through the combustion chamber and in which a fuel-air ratio may vary over a considerable range with some of the mixture being outside this specified range which is desired for the most efficient combustion. Ignition will be difficult to initiate or sustain where the fuel-to-air ratio in this combustible mixture is either greater or less than the ratio determined necessary for sustained combustion. Consequently, ignition systems developed for internal combustion engines have not proven readily adaptable with any great degree of success to turbine engines and such existing ignition systems have required substantial modification to be adapted to installation or incorporation with a turbine engine. Through extensive studies and research into the problem of ignition relative to turbine engines, it has been found that the ignition of the combustible mixture is greatly enhanced with consequent increase in the combustion efficiency where the igniting spark discharged is maintained for a relatively long time interval.

A relatively high voltage impulse is required to break down the spark gap of either the air gap-type plug or the semiconductive, surface-gap-type plug. In the case of the former, a large voltage pulse is applied to the gap to provide ionization and a spark discharge across the intervening air gap, and in the latter, a relatively high current pulse produced by the voltage pulse is required for ionization of the surface gap to result in the required spark discharge. In either instance, once the gap has been ionized with resultant spark discharge, the voltage requirement for sustained conduction is substantially reduced irrespective of the particular type of igniter plug or spark gap device. The energy required to initiate combustion is substantially the same and this energy may be transferred to the igniter plug, either as a high voltage of relatively short duration or at a relatively lower voltage over a considerably extended period of time. The time involved in the spark discharge is in the order of microseconds with the high voltage pulses normally lasting for an interval of a few micro-seconds while a lower voltage may be applied to transfer energy over a substantially greater period of time. Turbine ignition systems, in accordance with the prior art, have utilized the high voltage pulses to transfer this energy and consequently require electrical energy storage units or components carrying a rating which is greatly in excess of that actually required for the electrical energy of the discharge in order to compensate for the lack of efficiency in the energy transfer. These high voltage discharges are effected through the oscillatory discharge of capacitive and inductive elements and a spark discharge will be obtained for each pulse of this oscillatory discharge which exceeds the minimum breakdown point for the discharge device. Each of the consecutive pulses in an oscillatory discharge which are of the same polarity produce an independent and individual spark discharge which contributes to the inefficiency of such prior art systems.

The ignition system for turbine engines disclosed herein substantially enhances the engine performance in that a high voltage discharge is provided to initiate the spark discharge and the energy transfer is completed through a relatively low-voltage, continuous pulse with the discharge waveform being of a predetermined shape. This objective is accomplished through the provision of a circuit which is capable of providing the high voltage pulse required for breakdown and ionization of the gap and includes a circuit which is capable of providing a relatively low-voltage, continuous spark discharge for a relatively long period of time. This system improves the efficiency of high energy transfer through reduction of system component losses and requires electrical energy storage components which are greatly reduced as to size and weight as compared to that required in prior art systems. This is of considerable advantage in the case of aircraft turbine engines.

These and other objectives and advantages of the gas turbine ignition system disclosed herein will be readily apparent from the following detailed description of an embodiment thereof and the accompanying drawings.

In the drawings:

FIGURE 1 is a circuit diagram of an ignition system embodying the invention;

FIGURE 2 is a circuit diagram of circuit components which may be substituted in the circuit shown in FIGURE 1 to provide a modified ignition system.

There is shown in FIGURE 1 an ignition system embodying this invention which is specifically adapted for utilization in conjunction with turbine engines forming the propulsion system for aircraft. This ignition system is shown connected with a single electric energy discharge device S and connected to receive power from a conventional aircraft power source of the well-known 115 volt, sinusoidal 400-cycle current which aircraft normally provide. This power source is not shown in detail and it will be readily understood that the power source may be varied in accordance with the particular installation and the input power portion of the illustrated circuit may be modified to an extent which will permit utilization of a direct current power source. In the illustrated embodiment, a 115-volt alternating current power source is shown which will conveniently provide the relatively high voltage required for operation of an ignition system whereas in a D.C. system of the normally available low voltage, it would be necessary to provide components which will convert the steady state D.C. into at least a pulsating voltage wave to permit step-up of the voltage to the required high voltage by means of a transformer. Since the particular power source does not form a part of this invention, the power source will not be shown or further described herein to any extent other than indicating that it will be of a type capable of providing the necessary voltages and power for operation of the system. A pi-secton filter network may be connected across the input terminals of the circuit to reduce interference with other components of the aircraft electrical system. This filter section may include an inductor 10 with two shunt connected capacitors 11 connected as shown in FIGURE 1.

A power transformer 12 is provided to step up the relatively low voltage input power to the required charging voltages of the system. This power transformer includes a single primary winding 13 which is connected across the filter section and to the input power terminals. The power transformer 12 includes the three secondary windings 14, 15 and 16 which comprise an appropriate number of turns relative to the primary winding 13 to result in the appropriate output voltage for the respective circuit segments which are connected to these secondary windings.

The secondary winding 14, which may provide a nominal output voltage of 300 volts, is connected to a first circuit of this ignition system which is designed to produce a relatively high voltage pulse for breakdown of the spark discharge device S and to a common ground conductor G. This first circuit includes an output transformer 17 having an input primary winding 18 and an output secondary winding 19. The secondary winding 19 is connected across the discharge device S while the primary winding 18 is connected to the secondary winding 14 of the power transformer 12 through an energy storage network. The turn-ratio of the primary and secondary windings 18 and 19 of the output transformer is such that the output voltage pulse is of the order of 9,000 volts with application of a 150-volt input voltage pulse to the primary winding.

Forming the energy storage network of this first circuit is a capacitor 20 which is series connected between the secondary winding 14 of the power transformer 12 and the primary winding 18 of the output transformer 17. A current-limiting resistor 21 is connected in series with the capacitor 20 as is a diode 22. The diode 22 restricts current flow to a single direction and thus enables the capacitor 20 to be charged and store electric energy.

Connected across the series-connected capacitor 20 and primary winding 18 of the output transformer 17 is a switching device 23 which is preferably of the silicon-controlled rectifier type to permit control of the capacitor discharge by electronic timing means. The switching device 23 is connected to permit current flow from the capacitor 20 through the switching device to the primary winding 18 of the output transformer when the switching device 23 is in a conductive state. During the charging operation, when electrical energy is being transferred from the secondary winding 14 to the capacitor 20 for storage, the switching device 23 will be maintained in a non-conducting state and thus prevent current flow through the switching device. The nominal 300-volt output of the secondary winding 14 will result in charging of the capacitor 20 to a nominal 300 volts as a consequence of the unidirectional current pulses applied to the capacitor through the diode 22. When the capacitor 20 is sufficiently charged, the switching device 23 may be triggered to a conductive state by the application of a gating voltage to the gating terminal 23a and results in an oscillatory discharge of the capacitor 20 into the primary winding 18 of the output transformer 17. This discharge results in a voltage pulse approximating 150 volts being applied to the primary winding 18. A return path for the oscillatory discharge is provided by a resistor 24 and series-connected diode 25 which are connected in shunt relationship with the series-connected capacitor 20 and primary winding 18. The resistor 24 is selected to have a resistance value which will provide damping of the oscillatory currents that result from the capacitor 20 and primary winding 18. Assuming that the switching device 23 has become non-conductive, which will be the case when the anode and cathode potentials become equal during the discharge sequence, and that a control signal or gating signal is not applied, the oscillating current formed by this circuit will be damped and result in a single high-voltage pulse of the order of 9,000 volts appearing at the output terminals of the secondary winding 19.

This high-voltage secondary output of 9,000 volts appearing at the output terminals of the secondary windings 19 is applied to the discharge device S through a pulse isolation network 26 and a series-connected control gap device 27. Forming the pulse isolation network 26 are a number of serially-connected diodes 28 which have a cumulative voltage rating at least equal to the maximum expected output voltage pulse from the output transformer 17. In the event of non-uniformity of the diode characteristics, a capacitor 29 is connected in shunt relationship to each diode and thus assures appropriate voltage sharing. The control gap device 27 is selected on the basis of considerations and characteristics which will be considered in subsequent paragraphs but will generally have a breakdown characteristic of approximately 1,000 volts such that the application of a voltage pulse in excess of this value will ionize the gap and result in conduction through the device.

Because of the relatively high voltage pulses encountered in this portion of the circuit, at least the conductor connecting the output of the control gap 27 with a terminal of the discharge device S will be provided with electromagnetic shielding indicated generally at 30. The shielding 30 is connected to the ground conductor G and will thus prevent radiation of high frequency signals which could possibly interfere with radio equipment included in the aircraft.

Control over the operation of the circuit through control of the time at which the switching device 23 will be conductive is effected by an electronic timing circuit indicated generally at 31. To provide the recurrent ignition pulse required in accordance with this invention, the timing circuit 31 is designed to form a gating signal for operation of the switching device 23 at periodic intervals. In the preferred embodiment of the apparatus, a gating signal is normally formed at the nominal rate of two pulses per second and thus triggers the operation of the apparatus to fire the discharge device S at the rate of two discharges per second.

The timing circuit 31 is transistorized and requires a low-voltage power source of the order of 20 volts D.C. which is provided by the secondary winding 16 of the power transformer 12. A full wave rectifier consisting of four bridge-connected diodes 32 is connected to the output of the secondary winding 16. The output terminals of the full wave bridge rectifier are connected across a filtering capacitor 33 with one terminal connected to the ground conductor G and the opposite terminal connected by a conductor 34 to the input of the timing circuit 31. Included in the timing circuit is a unijunction transistor 35 having one base terminal connected to the input conductor 34 through a series-connected resistor 36 and a second base terminal connected to the ground conductor G through a series-connected resistor 37 and the conductor 38. An output voltage pulse is obtained from the timing circuit 31 by means of a conductor 39 connected to the junction of the second base terminal and the resistor 37. This conductor is connected to the gating terminal 23a of the switching device 23. Timing of the operation of the circuit is effected by a resistance-capacitance timing circuit which comprises the series-connected resistor 40 and capacitor 41. The junction of the resistor-capacitor is connected to the control electrode or emitter 42 of the unijunction transistor. With the transistor 35 in a nonconductive state and the capacitor 41 discharged, a current will flow through the resistor 40 and charge the capacitor 41 at a rate determined by the time constant of this timing network. When the charge on the capacitor 41 reaches a value where the voltage is sufficient to trigger the transistor 35 to a conductive state, current will then flow through the transistor and the resistor 37 producing a voltage drop and a resultant voltage pulse on the conductor 39 which is the gating signal for the switching device 23. While the transistor 35 is conductive, the capacitor 41 will then be discharged to the point where the transistor will become nonconductive and the timing cycle will then be repeated.

Through appropriate selection of the resistance and capacitance values for the resistor 40 and capacitor 41, the repetition rate of this timing cycle may be selected for optimum operation of the ignition system. In the illustrated embodiment, the resistor 40 is preferably of the selectively variable type which may be set at a predetermined value to obtain the desired time constant for operation of the timing circuit at the desired repetition rate. It has been determined through testing procedures that the nominal repetition rate of two pulses per second is sufficient for normal operation of the ignition system for a turbine engine. However, there are operating conditions such as when starting a turbine engine, where a higher repetition rate is desired for transfer of greater energy to the combustible fuel-air mixture. A pulse repetition rate of the order of ten pulses per second has been found to substantially increase the efficiency of the combustion process under adverse conditions. Similarly, where optimum combustion conditions present, it has been found that reduction of the nominal pulse repetition rate to one pulse every two seconds will also provide an enhanced combustion process. Thus, the resistor 40 is selected to have a value which may be readily adjusted from the nominal value to provide a pulse repetition rate at either end of the indicated range or at some intermediate selected rate. This adjustment may either be effected manually or through appropriate automatic servo-mechanism control systems. Such systems are not a part of this invention and are accordingly not further described or illustrated. The several components of the timing circuit 31 are selected such that the voltage drop across the resistor 37 will approximate four volts which is adequate for triggering or gating of most switching devices of the silicon-controlled rectifier type.

In accordance with this invention, the initial breakdown of the energy discharge device S is effected by the application of the high voltage pulse through the first circuit described hereinbefore. Subsequent to the establishment of a conductive path through the ionized mixture between the terminals of the discharge device, a sustained current flow is maintained at a relatively lower voltage by a second circuit to be described hereinafter. This second circuit includes a pulse-forming network indicated generally at 45 having one terminal connected to the common ground conductor G and the opposite terminal connected to the secondary winding 15 of the power transformer 12 through the charging resistor 48 and a single diode rectifier 49 which provides half-way rectification. This pulse-forming network 45 may comprise a series-parallel connected, inductive and capacitive network as shown in FIGURE 1. The secondary winding 15 comprises a number of turns sufficient to provide a nominal output voltage of 1,000 volts which will thus charge the pulse-forming network 45 to the nominal voltage of 1,000 volts. The high voltage terminal of the pulse-forming network 45 is also connected to the input terminal of the control gap device 27 through a pulse isolation network indicated generally at 50. This pulse isolation network 50 is similar to that previously described in conjunction with the first circuit and consists of several serially connected diodes 51 which have a cumulative voltage rating to prevent breakdown and reverse current flow due to the high voltage pulse resulting from the operation of the first circuit. A number of capacitors 52 are connected in shunt relationship with the diodes 51 to assure proper voltage sharing.

Since the control gap device 27 is selected to have a breakdown or ionization voltage level which is greater than the nominal voltage at which the pulse-forming network 45 is charged, this network 45 will not discharge through the discharge device S until a firing pulse is obtained from the first circuit. Subsequent to ionization of the gap device 27 and the discharge device S resulting in a relatively low resistance conductive path, the pulse-forming network 45 will discharge through the device 27 resulting in a transfer of energy to the spark or arc formed at the discharge device S. Through appropriate selection of the inductive and capacitive values of the respective inductive and capacitive components 46 and 47 of the pulse-forming network 45 which may take the form of a lumped parameter delay-line, the discharge pulse resulting from the pulse-forming network 45 is appropriately shaped to produce a sustained current flow for a relatively long time interval. This time interval may be of the order of 20 microseconds while the high voltage pulse has a maximum duration of only two to three microseconds. Thus, the energy transfer is effected over a relatively long time interval and permits an increase in the transfer of energy for comparable components relative to that effected by prior art apparatus. The resultant voltage waveform of the discharge across the device S is graphically illustrated in FIGURE 1 and it will be noted that the high voltage pulse is of a relatively short duration compared to the sustained low voltage discharge.

In each of the circuits heretofore described, a resistor 21 or 48 has been inserted in series for purposes limiting the charging current to the respective storage element. The performance of the circuit may be improved through the substitution of an inductor for the charging resistance. An arrangement which may be substituted for the resistance is shown in FIGURE 2. Also included with an inductor 54 is a series-connected diode 55. This inductor and diode circuit is inserted in circuit at the respectively marked terminals A and B for either the first or second circuit. During the charging operation, the inductor and capacitances will produce an oscillatory charging current for increased storage capacity of the storage elements.

It is readily apparent from the foregoing detailed description that the turbine ignition system of this invention is capable of greatly improving the efficiency and operation of turbine engines. Controlled discharge of a capacitor for initiation of a spark discharge by means of a controllable switching device permits precise control over the frequency at which the spark discharges occur to assure positive ignition. Utilization of two electrical energy storage and discharge circuits permits proper shaping of the discharge waveform for optimum energy transfer as controlled by the switching device.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An electrical ignition system for effecting a controlled discharge through an electrical discharge device comprising (A) an output terminal connectable with the discharge device,
(B) first circuit means for forming a high-voltage pulse of electric energy to initiate conduction through the discharge device and including
  (1) an input terminal connectable with a source of electric energy for receiving electrical energy therefrom,
  (2) electrical energy storage means connected with said input terminal to receive and store electric energy and connected in circuit with said output terminal to discharge energy thereto during a relatively short time interval,
  (3) unidirectional current conducting means connected in circuit between said energy storage means and said output terminal to permit current flow only to said output terminal,
  (4) switch means connected in circuit with said energy storage means for selectively controlling the time of discharge of the stored electric energy from said storage means to said output terminal, said switch means being normally nonconductive and triggered to a conductive state in response to a control signal applied thereto, and
  (5) control-signal-forming means connected with said switch means for forming and applying a control signal to said switch means, and
(C) second circuit means for forming a relatively low-voltage pulse of electric energy sufficient to sustain conduction through the discharge device but insufficient to initiate such conduction and including
  (1) an input terminal connectable with a source of electric energy for receiving electric energy therefrom,
  (2) an electric energy storage and pulse forming network connected to said last named input terminal for receiving energy for storage and connected to said output terminal for discharge of stored energy subsequent to initiation of conduction through the discharge device by said first circuit means, said energy storage and pulse forming network forming an energy pulse of predetermined waveform for a relatively long time interval, and
  (3) unidirectional current conducting means connected in circuit between said energy storage and pulse forming network and said output terminal to permit current flow only to said output terminal.

2. An electric ignition system according to claim 1 wherein said first circuit means includes an output transformer having a primary winding connected in circuit with said energy storage means and said switch means for discharge of the stored energy into said primary winding when said switch means is in a conductive state, and a secondary winding connected in circuit with said output terminal through said first named unidirectional current conducting means, said primary and secondary windings having a turns ratio to step-up the voltage output.

3. An electrical ignition system according to claim 2 wherein said energy storage means comprises a capacitor connected in series with said primary transformer winding and said switch means.

4. An electrical ignition system according to claim 3 wherein said switch means comprises a gated rectifier connected in shunt relationship with said series connected capacitor and primary transformer winding, said gated rectifier having an anode terminal connected to said capacitor, a cathode terminal connected to said primary transformer winding and a gating terminal connected with said control-signal-forming means for receiving a control signal to switch said gated rectifier to a conductive state.

5. An electrical ignition system according to claim 4 wherein said control-signal-forming means includes a voltage-pulse-forming circuit operative to repetitively form a voltage-pulse control signal at a selected frequency.

6. An electrical ignition system according to claim 5 wherein said control-signal-forming means includes a timing circuit for controlling the frequency of operation of said voltage-pulse-forming circuit, said timing circuit being selectively adjustable for operation at a specific frequency with a predetermined range.

7. An electrical ignition system according to claim 3 wherein said first circuit means includes a series-connected resistor-diode circuit connected in shunt relationship with said series connected capacitor and primary transformer winding, for forming a current-damping circuit for the return discharge pulse, said diode having the cathode terminal thereof connected with said capacitor.

8. An electrical ignition system according to claim 1 which includes a control gap device series connected between said output terminal and said first and second circuit means, said control gap device having a breakdown potential substantially less than the discharge energy pulse voltage of said first circuit means and substantially greater than the discharge energy pulse voltage of said second circuit means.

9. An electrical ignition system according to claim 1 wherein said electric energy storage and pulse forming network comprises a series-parallel connected inductive and capacitive network forming a delay line.

10. An electrical ignition system according to claim 1 wherein said first circuit means includes an inductor series connected between said first circuit means and said electric energy storage means to form an oscillatory charging circuit.

11. An electrical ignition system according to claim 1 wherein said second circuit means includes an inductor series connected between said second circuit means and said energy storage pulse forming network to form oscillatory charging circuit.

References Cited
UNITED STATES PATENTS

| | | | |
|---|---|---|---|
| 3,045,148 | 7/1962 | McNulty et al. | 315—183 |
| 3,267,329 | 8/1966 | Segall | 315—183 |
| 3,302,058 | 1/1967 | Otteman et al. | 315—207 |
| 3,375,403 | 3/1968 | Flieder | 315—240 |

VOLODYMYR Y. MAYEWSKY, *Primary Examiner.*

U.S. Cl. X.R.

315—183